United States Patent Office 3,038,926
Patented June 12, 1962

3,038,926
ORGANIC DIOL ARYL BORONATES
Jean-Marie Farthouat, Romainville, France, assignor, by mesne assignments, to Roussel-UCLAF, S.A., Paris, France, a corporation of France
No Drawing. Filed June 22, 1959, Ser. No. 821,653
Claims priority, application France Sept. 17, 1958
6 Claims. (Cl. 260—462)

The present invention relates to new organic derivatives of boron and more particularly to new derivatives of arylboronic acids.

The object of the invention is to provide as new compounds: cyclic diesters of arylboronic acids and of diols and in particular 1-2 and 1-3 diols.

The arylboronic acids having the formula $$Ar-B\diagup^{OH}_{\diagdown OH}$$

wherein Ar is an aryl radical which is substituted or unsubstituted—which are diacids—produce upon esterification with diols cyclic diesters.

When the diols are 1-2 and 1-3 diols, the cyclic diesters which respectively satisfy the general Formulae I and II; and can be defined as 2-aryl-1.3.2-dioxaborolanes and 2-aryl-1.3.2-dioxaborinanes respectively, possess 5 and 6 membered cycles which imparts thereto maximum stability according to the Bayer rule of tensions. The invention therefore concerns more particularly these latter diesters. Thus the object of the invention is to provide cyclic diesters of arylboronic acids and of 1-2 and 1-3 diols having the general formula:

wherein $n$ is an integer selected from 0 to 1,
$R_1$ is selected from the group consisting of hydrogen and lower alkyl radicals,
$R_2$ is selected from the group consisting of lower alkyl radicals and the dichloroacetamido radical,
$R_3$ is selected from the group consisting of hydrogen and phenoxymethyl, cresoxymethyl, methoxyphenoxymethyl and p-nitrophenyl radicals, and
$R_4$ is selected from the group consisting of hydrogen, lower alkyl, lower alkoxy, $-NO_2$, $-NH_2$ and $-COOH$ radicals.

These new cyclic diesters can be used as intermediate products in the synthetic preparation of new active compounds. They have in themselves very interesting therapeutic properties. It has indeed been discovered that arylboronic acids are powerful potentiaters of a certain number of medicines and that this potentiation reaches its maximum when these acids are chemically combined with the medicinal substances instead of simply being mixed therewith.

Consequently, among the new cyclic esters according to the invention are to be found those of 1-2 and 1-3 diols having in themselves physiologic properties. These esters constitute in consequence substances having an exalted physiologic activity. The interest of these esters is still further heightened by the fact that they are furthermore generally less toxic than the diols from which they are derived.

Among the arylboronic acids having the formula combined in the new cyclic diesters, there may be mentioned notably: phenylboronic acid, ortho-, meta- or para-tolylboronic acid, ortho-, meta- or para-anisylboronic acid, ortho-, meta- or para-nitrophenylboronic acid, ortho-, meta- or para-carboxyphenylboronic acid and ortho-, meta- or para-aminophenylboronic acid.

Among these acids preference is given to those capable of producing by degradation in the organism only substances which are but slightly toxic, such as tolylboronic and anisylboronic and carboxyphenylboronic acids.

As concerns the diols having the general formula $$HOH_2C-(\overset{R_1}{\underset{\phantom{|}}{C}})_n-\overset{R_3}{\underset{\phantom{|}}{C}}HOH$$

preference is given to diols having in themselves interesting physiologic properties, such as 1-phenoxy-propane-2.3-diol, 1-cresoxy-propane-2.3-diol or 2-methyl-2-n-propyl-propane-1.3-diol, or D(−) threo-1-p-nitrophenyl-2-dichloroacetamidopropane-1.3-diol.

Another object of the invention is to provide a process of preparing these new esters. This process comprises condensing an arylboronic acid having the formula or its anhydride and a diol having the formula $$HOH_2C-(\overset{R_1}{\underset{\phantom{|}}{C}})_n-\overset{R_3}{\underset{\phantom{|}}{C}}HOH$$

by heating a mixture of these two substances at a suitable temperature.

According to one mode of carrying out this process, the arylboronic acid is mixed with the diol in stoichiometric proportions and this mixture is heated to a temperature capable of causing melting during the time necessary for the reaction, whereas the water formed in the course of the reaction is eliminated by creating sufficient vacuum. The reaction mixture could also be prepared with an excess of one or the other of the reactants. According to another mode of carrying out the process, there is added to the mixture a solvent capable of dissolving the two constituents, such as benzene or a mixture of ethyl alcohol and benzene: the water formed in the course of the reaction is then eliminated by distillation of the water-benzene or the water-alcohol-benzene azeotropic mixture. The use of a solvent is particularly advantageous when it is desired to effect the reaction at a temperature below the melting temperature of the mixture. If the diol and the arylboronic acid are both soluble in water or in a hydroalcohol mixture, and if the ester formed is insoluble in this solvent, the condensation is particularly simple: the diol and arylboronic acid solutions are mixed and the precipitation of the ester is observed after leaving the mixture a certain period of time. This last mode of preparation well illustrates the great stability of these cyclic esters, since the esterification with elimination of water occurs then actually within the aqueous medium. When a hydroalcoholic medium is used as a solvent, and the ester formed is rather soluble in this medium, its precipitation is obtained by distilling the alcohol.

By way of modification and as indicated hereinafter, these esters could also be prepared by condensation of the arylboronic anhydrides with the diols. The reaction occurs without elimination of water and it is unnecessary to provide for the evacuation of water under a vacuum or through the medium of an azeotropic mixture. The condensation is obtained therefore by heating at a suitable temperature the mixture of arylboronic anhydride and diol without solvent, or in a solvent such as benzene, toluene, xylene, acetone or any other usual solvent which would be the most advantageous as to its boiling temperature or dissolving power.

The following examples illustrate the invention, it being understood that the scope of the invention is not intended to be limited thereto. The melting points indicated are the instantaneous melting point determined on a maquenne block.

*Example I.—Phenylboronate of 1-Phenoxy-Propane-2.3-Diol or 2-Phenyl-4-Phenoxymethyl-1.3.2-Dioxaborolane*

10 g. of phenylboronic acid are dissolved in 162 cc. of methanol and 13.6 g. of 1-phenoxy-propane-2.3-diol are dissolved in 500 cc. of water.

The two solutions are brought to a temperature of 60° C. and mixed at this temperature. The ester crystallizes upon cooling. It is filtered, dried and recyrstallized in hexane.

It is in the form of colourless crystals having a melting point of 68° C.

*Example II.—p-Tolylboronate of 1-Phenoxy-Propane-2.3-Diol or 2-p-Tolyl-4-Phenoxymethyl-1.3.2-Dioxoborolane*

22 g. of p-tolyl-boronic acid are dissolved in 220 cc. of methanol and 54 g. of 1-phenoxy-propane-2.3-diol are dissolved in 2 litres of water. These two solutions are brought to a temperature of 60° C. and mixed at this temperature. Upon cooling and after being left over-night, the ester crystallizes. It is filtered, dried and recrystallized in normal hexane. It is in the form colourless crystals having a melting point of 98° C.

*Example III.—p-Tolylboronate of 2-Methyl-2-n-Propyl-Propane-1.3-Diol or 2-p-Tolyl-5-Methyl-5-n - Propyl-1.3.2-Dioxaborinane*

40 g. of p-tolylboronic acid are dissolved in 400 cc. of methanol and 65 g. of 2-methyl-2-n-propyl-propane-1.3-diol are dissolved in 800 cc. of water. These two solutions are brought to a temperature of 60° C. and mixed at this temperature. Upon cooling, the ester crystallizes. It is filtered, dried and recrystallized in methanol. It is in the form of colourless crystals having a melting point of 54° C. The yield reaches 90%.

*Example IV.—p-Tolylboronate of 2-Methyl-2-n-Propyl-Propane-1.3-Diol*

234 g. of p-tolylboronic acid are intimately mixed with 228 g. of 2-methyl-2-n-propyl-propane-1.3-diol by crushing in a mortar. This mixture is heated progressively under a pressure of 20 mm. of mercury. The departure of the water causes the start of tumultuous boiling; when this has calmed down, the heating is continued up to a temperature of 150°–160° C. for a few hours. After cooling, the mass is recrystallized in methanol. It is in the form of colourless crystals having a melting point of 54° C. The yield was 90%.

*Example V.—p-Tolylboronate of 1-Cresoxy Propane 2.3-Diol or 2-p-Tolyl 4-o-Cresoxy-Methyl-1.2.3-Dioxaborolane*

The procedure is the same as in Example IV except that the melting is effected at a temperature of 100°–120° C. starting with the mixture of 8.5 g. of p-tolylboronic acid and 11.3 g. of 1-o-cresoxy-propane-2.3-diol. The mass is recrystallized in methanol. It is in the form of colourless crystals having a melting point of 42° C.

*Example VI.—p-Tolylboronate of D(—)Threo-1-p-Nitrophenyl-2-Dichloracetamido-Propane-1.3-Diol or (—) Cis-2-p-Tolyl-4-Para-Nitro-Phenyl-5 - Dichloracetamido-1.3.2-Dioxaborinane*

To a boiling solution of 15.95 g. of D(—)threo-1-p-nitrophenyl-2-dichloracetamido-propane-1.3-diol in 45 ml. of methanol there is added a solution of 6.8 g. of p-tolylboronic acid in 25 ml. of methanol and the mixture is refluxed for some minutes. A voluminous precipitate is obtained. It is cooled, filtered, washed with a few millilitres of methanol and 17 g. of p-tolylborate of D(—)thero-1-p-nitrophenyl-2-dichloracetamido-propane-1.3-diol are obtained in the form of colourless crystals having a melting point of 177°–178° C. By concentrating the mother solution, there is obtained a second crop which brings the overall yield to 91%.

The compounds of Examples I and II possess analgesic properties, those of Examples III and IV accentuated tranquilizing properties, that of Example V a decontracting activity, and the compound of Example VI an improved antibiotic activity.

It must be understood that the scope of the invention is not limited to the described modes of carrying out the invention which have been given merely by way of example.

Having now described my invention what I claim as new and desire to secure by Letters Patents is:

1. A compound selected from the group of compounds consisting of 1-phenoxy-propane-2.3-diol phenylboronate; 1-phenoxy-propane-2.3-diol p-tolylboronate; 2-methyl-2-n-propyl-propane-1.3-diol p-tolylboronate; 1-cresoxypropane-2.3-diol p-tolylboronate; D(—)threo-1-p-nitrophenyl-2-dichloroacetamido-propane-1.3-diol p-tolylboronate.

2. 1-phenoxy-propane-2.3-diol phenylboronate.

3. 1-phenoxy-propane-2.3-diol p-tolylboronate.

4. 2-methyl-2-n-propyl-propane-1.3-diol p-tolylboronate.

5. 1-cresoxypropane-2.3-diol p-tolylboronate.

6. D(—)thero-1-p-nitrophenyl - 2 - dichloracetamidopropane-1.3-diol p-tolylboronate.

References Cited in the file of this patent

Steinburg et al.: Industrial and Eng. Chem., vol. 49, pp. 174 to 181 (1957).

Sugihara et al.: J. Am. Chem. Soc., vol. 80, pp. 2443–6 (May 20, 1958).